(12) United States Patent
Naito et al.

(10) Patent No.: US 8,820,450 B2
(45) Date of Patent: Sep. 2, 2014

(54) WHEEL LOADER

(75) Inventors: Toru Naito, Ishikawa (JP); Yutaka Tanaka, Ishikawa (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 0 days.

(21) Appl. No.: 13/634,460

(22) PCT Filed: Dec. 15, 2011

(86) PCT No.: PCT/JP2011/079089
§ 371 (c)(1),
(2), (4) Date: Sep. 12, 2012

(87) PCT Pub. No.: WO2012/086521
PCT Pub. Date: Jun. 28, 2012

(65) Prior Publication Data
US 2013/0000999 A1    Jan. 3, 2013

(30) Foreign Application Priority Data
Dec. 24, 2010   (JP) ................. 2010-288819

(51) Int. Cl.
| | | |
|---|---|---|
| B60K 11/00 | (2006.01) |
| E02F 9/08 | (2006.01) |
| B60K 11/08 | (2006.01) |
| B60K 11/04 | (2006.01) |
| F01P 7/10 | (2006.01) |
| B60R 19/52 | (2006.01) |

(52) U.S. Cl.
CPC .......... *E02F 9/0866* (2013.01); *B60W 2300/17* (2013.01); *B60W 2300/50* (2013.01); *F01P 7/10* (2013.01); *B60R 2019/525* (2013.01); *B60R 19/52* (2013.01); *B60K 11/08* (2013.01); *B60K 11/04* (2013.01)
USPC ........................................ 180/68.1

(58) Field of Classification Search
CPC ........ B60K 11/04; B60K 11/06; B60K 11/08; B60K 11/085; B60R 19/52; B60R 19/00; B60R 2019/525
USPC .................... 180/68.1, 68.2, 68.3, 68.4, 68.6; 296/193.1, 115; 165/41, 98, 134.1; 160/DIG. 2; 454/158
See application file for complete search history.

(56) References Cited

U.S. PATENT DOCUMENTS

| | | | |
|---|---|---|---|
| 1,958,995 A * | 5/1934 | Green .................... | 180/68.6 |
| 2,542,238 A | 2/1951 | Dreyfuss | |

(Continued)

FOREIGN PATENT DOCUMENTS

| | | |
|---|---|---|
| CN | 101357619 A | 2/2009 |
| DE | 43 15 163 A1 | 11/1994 |

(Continued)

OTHER PUBLICATIONS

Office Action dated Feb. 4, 2013 from Chinese Patent Application No. 201180012677.1, including English translation, 7 pages.

(Continued)

*Primary Examiner* — J. Allen Shriver, II
*Assistant Examiner* — James M Dolak
(74) *Attorney, Agent, or Firm* — Fish & Richardson P.C.

(57) ABSTRACT

A wheel loader includes a cooling chamber, which houses a cooling fan and a cooling device, and a grill through which a cooling air obtained by the cooling fan passes. The grill includes a frame, which is provided by framing four side components, and a ventilation portion, which is made of a punching metal and which also has a plurality of air intakes. The ventilation portion is provided inside the frame, and it is a stepwise member with vertically arranged steps that are created by plastic working the punching metal. The ventilation portion has a three-dimensionally curved surface that bulges bidirectionally toward an outside of the cooling chamber.

20 Claims, 8 Drawing Sheets

(56) References Cited

U.S. PATENT DOCUMENTS

| | | | |
|---|---|---|---|
| 3,660,956 A * | 5/1972 | Budlong | 52/669 |
| 3,762,489 A * | 10/1973 | Proksch et al. | 180/68.1 |
| 3,837,149 A * | 9/1974 | West et al. | 180/68.1 |
| 4,169,501 A * | 10/1979 | Takeuchi et al. | 165/126 |
| 4,287,961 A * | 9/1981 | Steiger | 180/68.4 |
| 4,334,588 A * | 6/1982 | Tezuka et al. | 180/68.6 |
| D356,584 S * | 3/1995 | Innes | D15/31 |
| 6,361,093 B2 | 3/2002 | Garberg | |
| 6,431,288 B1 * | 8/2002 | Hoffart | 172/439 |
| 6,435,264 B1 * | 8/2002 | Konno et al. | 165/41 |
| 6,589,307 B2 * | 7/2003 | Jaramillo et al. | 180/68.6 |
| 7,261,173 B2 * | 8/2007 | Kurtz et al. | 180/69.2 |
| 7,581,607 B2 * | 9/2009 | Moen et al. | 180/68.6 |
| 7,753,152 B2 * | 7/2010 | Nakae et al. | 180/68.1 |
| 8,430,195 B2 * | 4/2013 | Jansen et al. | 180/69.2 |

FOREIGN PATENT DOCUMENTS

| | | |
|---|---|---|
| EP | 2 193 947 A1 | 6/2010 |
| JP | 2001-26222 A | 1/2001 |
| JP | 2001-342644 A | 12/2001 |
| JP | 2004-352089 A | 12/2004 |
| WO | 2009/017749 A1 | 2/2009 |

OTHER PUBLICATIONS

International Search Report mailed Mar. 6, 2012 in International Application No. PCT/JP2011/079089, including English translation, 4 pages.

Supplementary European Search Report dated May 8, 2013 from corresponding European Application No. 11851827.3, 5 pages.

* cited by examiner

WHEEL LOADER

CROSS-REFERENCE TO RELATED APPLICATIONS

This application claims priority to Application No. PCT/JP2011/079089, filed Dec. 15, 2011, which application claims priority to Japanese Application No. 2010-288819, filed on Dec. 24, 2010. The contents of the above applications are incorporated herein by reference in their entireties.

TECHNICAL FIELD

The present invention relates to a wheel loader.

BACKGROUND ART

A known wheel loader includes an engine room accommodating an engine and a cooling chamber accommodating an engine-cooling radiator and the like and divided from the engine room by a partition. The wheel loader supplies a cooling air drawn in through a grill at the rear of the vehicle toward the cooling chamber to cool the radiator and discharges the cooling air having been used for cooling from lateral and upper sides of the cooling chamber (see, for instance, Patent Literature 1).

In Patent Literature 1, the grill portion (inlet of the cooling air) is provided with a plurality of air intakes. The size of an opening provided to a fin of the radiator is larger than the size of the air intakes and the size of exhaust holes provided to the lateral and upper sides of the cooling chamber is larger than the size of the opening of the fin. Accordingly, dusts and the like having passed through the air intakes of the grill also pass through the radiator and are discharged to the outside through the exhaust holes along with the flow of the cooling air, such that less amount of dusts resides within the cooling chamber and maintenance work can be facilitated.

CITATION LIST

Patent Literature(s)

Patent Literature 1: WO09/017,749

SUMMARY OF THE INVENTION

Problems to be Solved by the Invention

The grill portion of the wheel loader of Patent Literature 1 is provided by a plate member having a multiple number of air intakes. In order to enhance the rigidity, the plate member is subjected to a bending process to provide a plurality of vertical steps.

However, though such a horizontal stepwise bending process sufficiently resists the load applied in the horizontal direction, the horizontal stepwise bending process does not provide any resistance against vertically applied loads. Thus, it is highly likely that the resistance against the vertical loads is provided by increasing the thickness of the grill portion. Thus, the weight of the grill portion is increased, which is inconvenient for assembling the grill portion.

An object of the invention is to provide a wheel loader that is capable of enhancing a rigidity of a grill portion while reducing weight of the grill portion, thereby facilitating assembly work.

Means for Solving the Problems

A wheel loader according to an aspect of the invention includes: a cooling chamber that houses a cooling fan and a cooling device; and a grill through which a cooling air obtained by the cooling fan flows, the grill including a frame provided by framing four side components and a ventilation portion provided in the frame by a punching metal with a plurality of air intakes, the ventilation portion being a stepwise member having a vertically arranged plurality of steps, the ventilation portion having a three-dimensionally curved surface bulging bidirectionally toward an outside of the cooling chamber.

According to the above aspect of the invention, the rigidity of the ventilation portion made of punching metal having a large number of air intakes is enhanced by the bending process to provide a plurality of vertical steps. In addition, since the entirety of the ventilation portion is curved by a plastic working and is housed in a frame provided by framing four side members, the rigidity of the entire grill can be significantly enhanced. Accordingly, as compared with typical grills of which rigidity is ensured by increasing the thickness of punching metal, the weight of the grill can be easily reduced and installation work of grills into vehicle frames can be facilitated.

In the above aspect of the invention, it is preferable that each of a bending angle of a ridge portion of the grill and a bending angle of a valley portion of the grill when the grill is seen from an outside is obtuse.

According to the above arrangement, since the respective bending angles of the valley portion and the ridge portion are obtuse, the face sections between the valley and ridge portions do not eminently protrude, so that foreign substances are not likely to adhere on the face sections to close the air intakes, thereby ensuring excellent ventilation characteristics of the grill and facilitating cleaning works and the like.

In the wheel loader according to the above aspect of the invention, it is preferable that a bending radius of a valley portion of the grill is larger than a bending radius of a ridge portion of the grill when the grill is seen from an outside.

Herein, the term "seen from an outside" refers to an instance in which the grill is seen from an outside of the vehicle. In the later-described exemplary embodiment, the term refers to an instance in which the grill is seen from a rear side of the vehicle.

According to the above arrangement, since the bending radius of the valley portion is made larger, foreign substances are unlikely to be clogged in the bent portion, thus also contributing enhancement of ventilation characteristics and convenience for cleaning.

In the wheel loader according the above aspect of the invention, it is preferable that a lower vertical length of a valley portion of the grill is larger than an upper vertical length of the valley portion of the grill when the grill is seen from an outside.

According to the above arrangement, since the length of the face section located at the lower side relative to the valley portion is larger than the length of the face section located at the upper side, foreign substances caught at an outer surface of the ventilation section of the grill securely fall off without being received at the valley portion. Consequently, excellent ventilation characteristic and cleaning convenience can be provided.

In the wheel loader according to the above aspect of the invention, it is preferable that the grill comprises an open/close grill provided at a center of the grill, the open/close grill being adapted to be opened and closed and a fixed grill disposed on both right and left sides of the open/close grill.

When the weight of the grill is large, open/close operations are not easily conducted. In addition, the large weight may sometimes require a damper device and the like for assisting the open/close operations, which may complicate the structure of the grill.

In contrast, according to the above arrangement, since the weight of the grill itself is reduced, the open/close grill can be easily opened/closed without using such an assist damper, so that open/close operations can be facilitated and structure of the grill can be simplified.

In the wheel loader according to the above aspect of the invention, it is preferable that the open/close grill is adapted to be opened/closed in right and left directions.

According to the above arrangement, since the open/close grill is opened/closed in the right and left directions, less power is required as compared to an arrangement in which the grill is vertically opened. Further, the cleaning work from an inside of the grill can be done not in an upwardly facing posture but in a normal standing posture without imposing hard work to an operator.

In the wheel loader according to the above aspect of the invention, it is preferable that the open/close grill is attached so that an upper side of the open/close grill comes near a front side of a vehicle.

According to the above arrangement, since the open/close grill is attached in an inclined manner so that the upper side of the open/close grill comes to the front side of the vehicle, the plurality of cooling devices in the cooling chamber can be arranged so that the cooling devices can be efficiently cleaned and the cooling air can be introduced into the cooling chamber while causing less amount of turbulence.

DESCRIPTION OF EMBODIMENT(S)

An exemplary embodiment of the invention will be described below with reference to the attached drawings.

It should be noted in the following description that the terms "front", "rear", "left" and "right" directions each refer to the front, rear, left and right directions for an operator seated on a driver seat in a cab 5 shown in FIG. 1.

Figure 1:
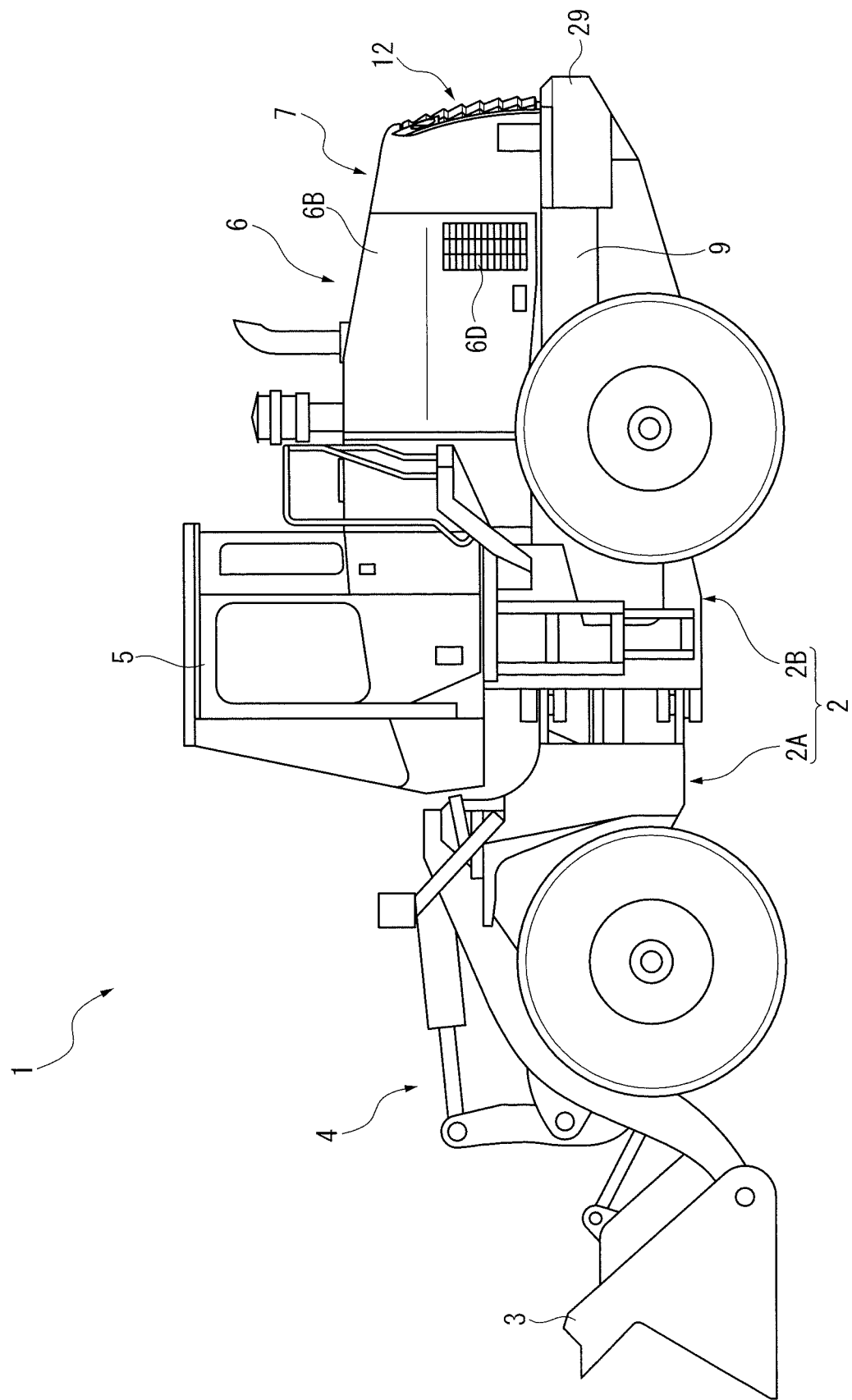
FIG. 1 is a side elevation showing an entire wheel loader according to a first exemplary embodiment of the invention.

A wheel loader 1 shown in FIG. 1 includes a vehicle body 2 having a front vehicle body 2A and a rear vehicle body 2B. A bucket 3 for excavation and loading is attached to a front side of the front vehicle body 2A via a working equipment drive mechanism 4 including a boom, a bell crank, a connecting link, a boom cylinder and a bucket cylinder.

A cab 5, an engine room 6 and a cooling chamber 7 are provided in sequence from the front side of the vehicle (i.e. in left direction in FIG. 1) on a rear vehicle body frame 9 (a vehicle body frame constituting the skeleton of the rear vehicle body 2B).

The cab 5 houses operation devices and a driver seat (not shown) for an operator to be seated.

Figure 2:
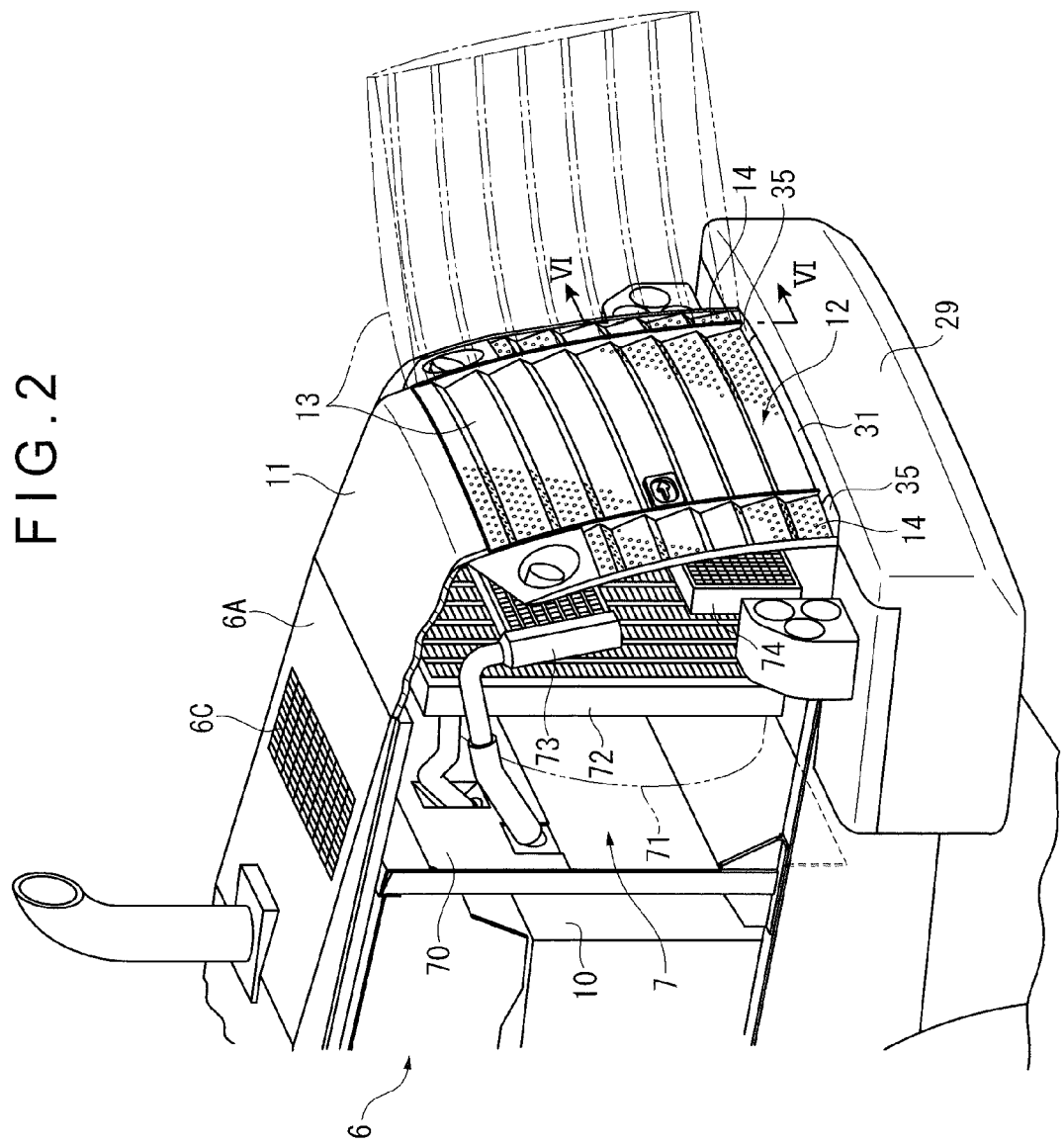
FIG. 2 is a perspective view showing a rear side of the wheel loader shown in FIG. 1 with a part thereof being sectioned.

As shown in FIG. 2, the engine room 6 is located near the rear side of the vehicle (right side in FIG. 1) relative to the cab 5. A ceiling face of the engine room 6 is provided by a ceiling cover 6A and right and left sides of the engine room 6 is provided by a side cover 6B. The ceiling cover 6A is detachably bolted to a surrounding exterior cover, an inner frame and the like. The right and left side covers 6B are configured to turn up around an upper side thereof.

In addition to an engine 10, the engine room 6 houses an air cleaner for purifying an intake air supplied to the engine 10, an exhaust gas purifying device for scavenging particulate matters in the exhaust gas from the engine 10 and the like.

The cooling chamber 7 is disposed on a vehicle rear side of the engine room 6. The cooling chamber 7 is covered with an exterior cover 11 for covering upper and right/left sides of the cooling chamber 7 and a grill 12 that is attached to a rear portion of the exterior cover 11. Cooling devices including a cooling fan 71 driven by an electric motor or a hydraulic motor, a radiator 72 cooled by a cooling air from the cooling fan 71, an aftercooler 73, an oil cooler 74 and an air-conditioner condenser (not shown) are housed in the cooling chamber 7. The radiator 72 cools engine cooling water. The aftercooler 73 cools an engine intake air. The oil cooler 74 cools hydraulic oil for hydraulic actuators such as the boom cylinder and the bucket cylinder. The air-conditioner condenser cools a coolant of an air conditioner installed in the cab 5.

In accordance with the rotation of the cooling fan 71, the cooling air is drawn in through the grill 12 toward the cooling chamber 7 and flows through the cooling devices toward the front side of the vehicle. The cooling air flowing toward the front side of the vehicle is discharged through an exhaust outlet 6C on the ceiling cover 6A and an exhaust outlet 6D (FIG. 1) on the side cover 6B near an outer periphery of a partition 70 at the front side of the engine room 6.

The cooling fan 71 is capable of reverse rotation automatically or by an operation on a selection switch by an operator in order to remove foreign substances clogged in the core of the cooling devices or the grill 12. The reverse flow of the cooling air generated by the reverse rotation of the cooling fan 71 discharges the clogged foreign substances to the outside through the grill 12.

Next, detailed description on the grill 12 will be given below.

As shown in FIG. 2, the grill 12 is provided by the open/close grill 13 that is openable/closable in right and left directions and fixed grills 14, 14 provided on both right and left sides of the open/close grill 13.

Figure 3:
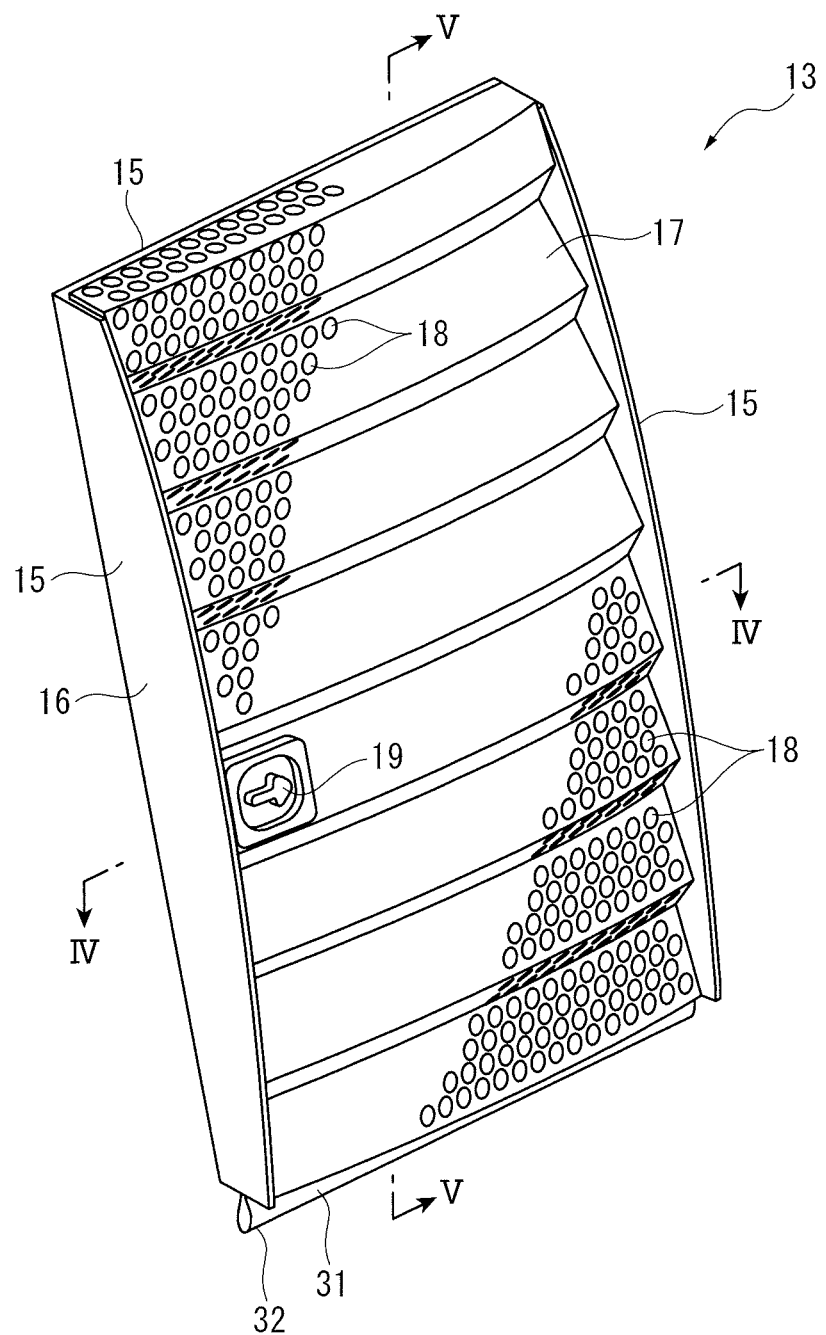
FIG. 3 is a perspective view showing an open/close grill of the wheel loader.

As shown in FIG. 3, the open/close grill 13 is provided by a rectangular frame 16 formed by framing upper, lower, right and left frame members 15, and a main ventilation portion 17 with an outer circumference thereof being fixed inside the frame 16 by welding and the like, in which an entire shape of the main ventilation portion 17 has a three-dimensionally curved shape (i.e. curved simultaneously in two directions). In other words, the presence of the frame 16 significantly enhances the rigidity of the entirety of the open/close grill 13 in the present exemplary embodiment as compared with typical grills. The same applies to the fixed grill 14.

The frame members 15 of the frame 16 are wide at a middle part thereof corresponding to a curved outer circumference of the main ventilation portion 17. The main ventilation portion 17 is provided by a punching metal having a large number of circular air intakes 18. The main ventilation portion 17 is subjected to plastic working such as that done by a press machine to provide a three-dimensionally curved profile in which a central portion is bulged toward an outer side relative to the cooling chamber 7 (i.e. a rear side of the vehicle) and is in a stepwise configuration having a plurality of steps that are vertically arranged. The above configurations also enhance the rigidity of the main ventilation portion 17 made of punching metal. In this exemplary embodiment, the phrase "three-dimensionally curved profile in which a central portion is bulged toward a rear side of the vehicle" refers to a curved profile bulging in two directions including a direction along the vertical ones of the frame members 15 and a direction along the horizontal ones of the frame members 15 (see dashed line in FIGS. 4 and 5). A knob 19 for opening/closing the open/close grill 13 is provided near one of the right and left sides of the main ventilation portion 17.

Figure 4:
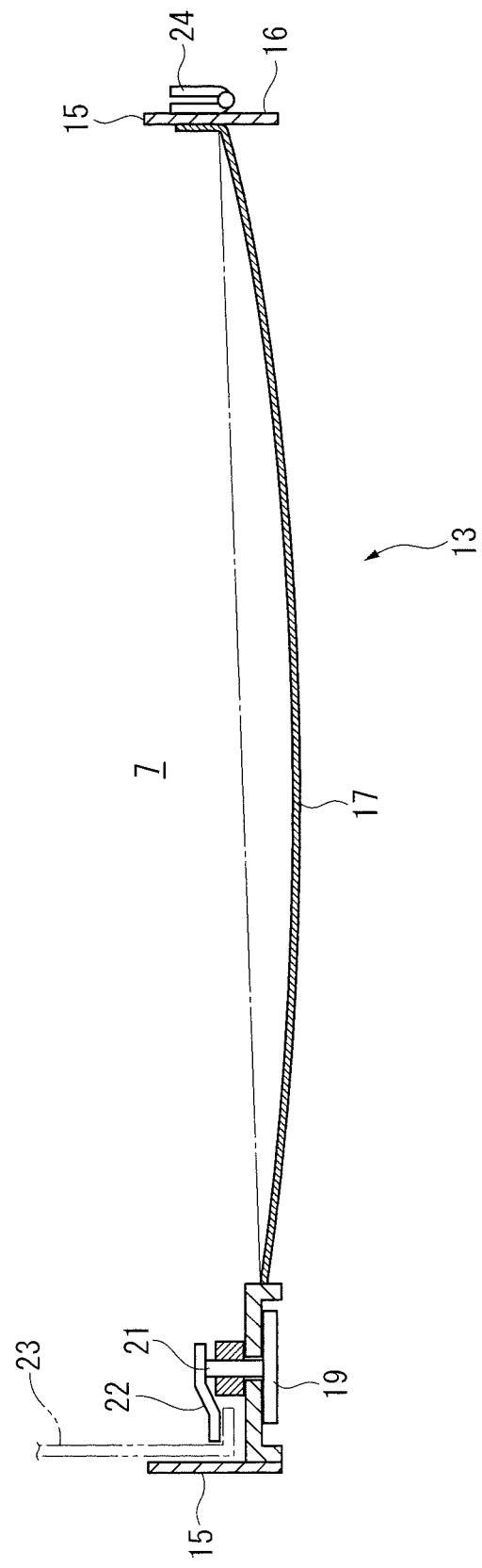
FIG. 4 is a horizontal cross section of the open/close grill, which is taken along arrows IV-IV in FIG. 3.

As shown in FIG. 4, the knob 19 is provided with a shaft 21 penetrating the main ventilation portion 17. An engagement piece 22 is attached to an end of the shaft 21. On the other hand, an engagement bracket 23 having an L-shape in plan view is fixed to a frame (not shown) in the cooling chamber 7. The engagement piece 22 is engaged with and disengaged from the engagement bracket 23. By disengaging the engagement piece 22 from the engagement bracket 23 with a rotation of the knob 19, the open/close grill 13 is openable and closable in right and left directions around a hinge 24 provided on the frame member 15 on a side opposite to the knob 19 (shown in a two-dot chain line in FIG. 2).

Though the engagement piece 22 is engaged and disengaged by the rotation of the knob 19 in this exemplary embodiment, the engagement piece 22 may be engaged and disengaged by the other device.

The open/close grill 13 is attached so that the upper side of the open/close grill 13 comes near the front side of the vehicle. This is because a part of the plurality of cooling devices in the cooling chamber 7 is installed in an inclined manner so that upper side thereof comes near the front side of the vehicle in order to facilitate the cleaning of the core of the cooling device. In this exemplary embodiment, the radiator 72 is vertically installed at a front side of the cooling chamber 7 and at a rear of the cooling fan 71. An oil cooler 74 is disposed at a position corresponding to a rear lower half of the radiator 71. An aftercooler 73 is disposed in an inclined manner at a position corresponding to a rear upper half of the radiator 71. The entirety of the oil cooler 74 is adapted to be opened/closed in right and left directions. However, the aftercooler 73 is fixed. This is because the air-conditioner condenser (not shown) is provided at a further rear side of the aftercooler 73. In order to allow the space between the radiator 72 and the aftercooler 73 to be cleaned, the aftercooler 73 is installed in an inclined manner and the air-conditioner condenser is also installed in an inclined manner in accordance therewith.

Since the open/close grill 13 is attached in an inclined manner and the hinge 24 is provided along the frame member 15 of the open/close grill 13, the open/close grill 13 draws a slightly obliquely upward open/close trajectory when the open/close grill 13 is opened/closed.

Figure 5:
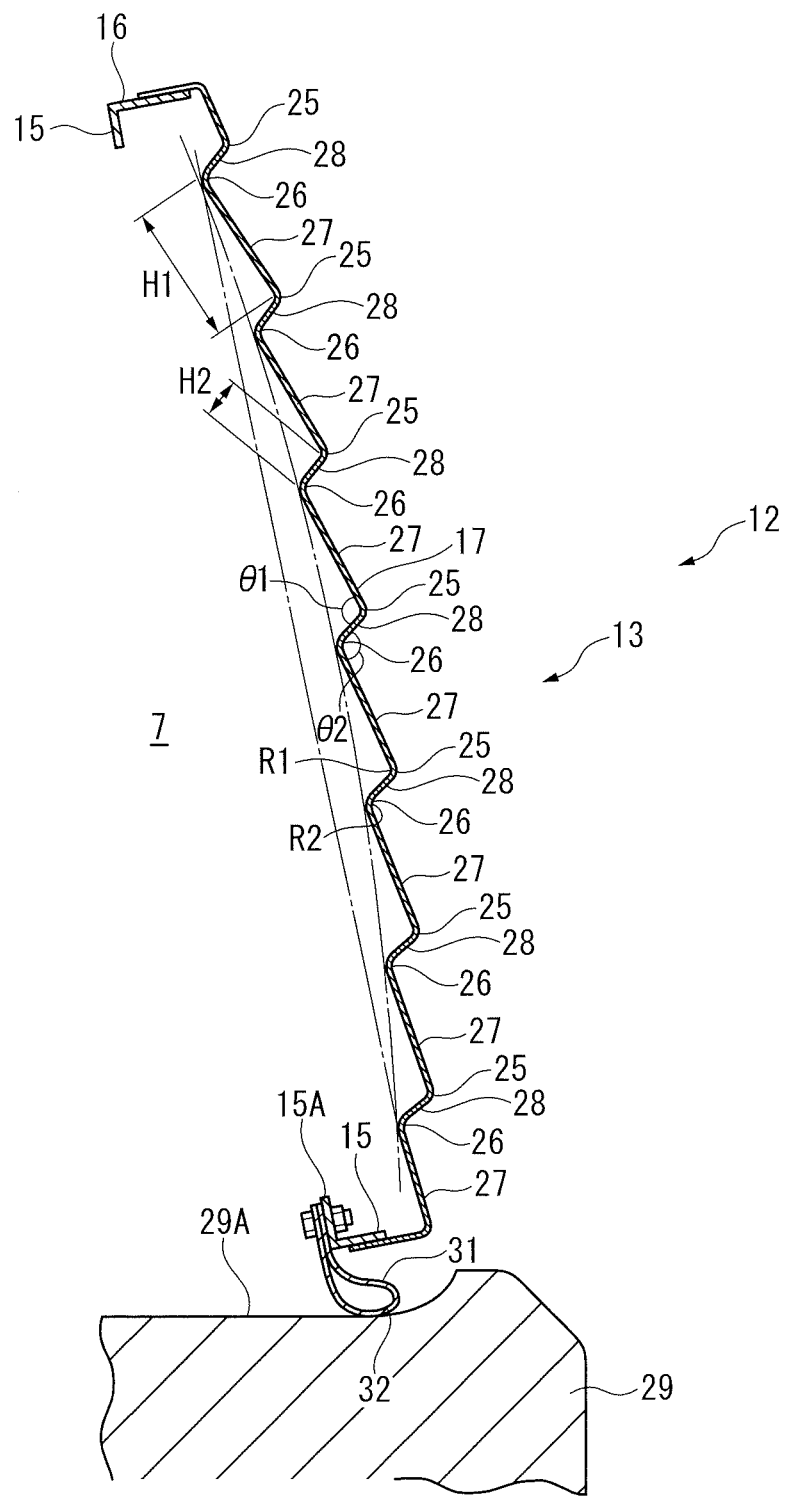
FIG. 5 is a vertical cross section of the open/close grill, which is taken along arrows V-V in FIG. 3.

FIG. 5 is a vertical cross section of the open/close grill 13.

In the main ventilation portion 17 having a wavy shape, a bending angle θ1 of a ridge portion 25 and a bending angle θ2 of a valley portion 26 when seen from an outside are both obtuse, which is, though not limitative, around 110 degrees in this exemplary embodiment. Further, though bending radii of the ridge portion 25 and the valley portion 26 are not specifically limitative, a bending radius R1 of the ridge portion 25 is 8 mm and a bending radius R2 of the valley portion 26 is 12 mm in this exemplary embodiment, where a relationship of R2>R1 is satisfied. The wavy shape is configured so that a vertical length H1 of a face section 27 on the outer side facing obliquely upward is larger than a vertical length H2 of a face section 28 facing obliquely downward. Accordingly, the face sections 27 accounts for a larger area in the entire wavy shape. Further, since the ridge portion 25 does not eminently bulge outward according to the relationship between θ1 and θ2 and between R1 and R2, the inclination of the face sections 27 can be increased so that it is unlikely that foreign substances are adhered on the face sections 27 to close the air intakes 18.

Incidentally, both of the bending radii R1 and R2 refer to the bending radius of an inner portion interposed between the face sections 27 and 28.

The main ventilation portion 17 that is curved in two directions and has a wavy shape is produced by press molding of a punching metal. The above-mentioned shape of the main ventilation portion 17 is designed in consideration of convenience for press molding and releasing from dies of a press machine. The number of press steps are determined according to the convenience for preparing the dies.

It should be appreciated that the main ventilation portion 17 may not be provided by press molding but by other molding methods.

The frame member 15 defining a lower side of the frame 16 has an L-shaped cross section and a rise piece 15A on the side of the cooling chamber 7. A first cover 31 for closing a gap between the open/close grill 13 and a counterweight 29 is bolted to the rise piece 15A.

The first cover 31 is provided by bending a flexible rubber sheet of a length substantially equal to the length of the frame member 15 in parallel to a long side of the sheet and fixing the bent rubber sheet on the rise piece 15A with the ends of the long sides being overlapped. A contact portion 32 on the lower side of the first cover 31 is rounded like a pouch, so that the contact portion 32 is in contact with an upper surface 29A of the counterweight 29 with a predetermined contact area. Accordingly, since the first cover 31 has no lower edge that is formed when the first cover 31 is provided by a simple curtain-like rubber sheet, the first cover 31 is not subjected to repeated (forward and reverse) bending steps caused by the lower edge contacting the upper surface 29A each time the open/close grill 13 is opened and closed, thus keeping the rubber sheet from being worn away at an early stage.

Figure 6:
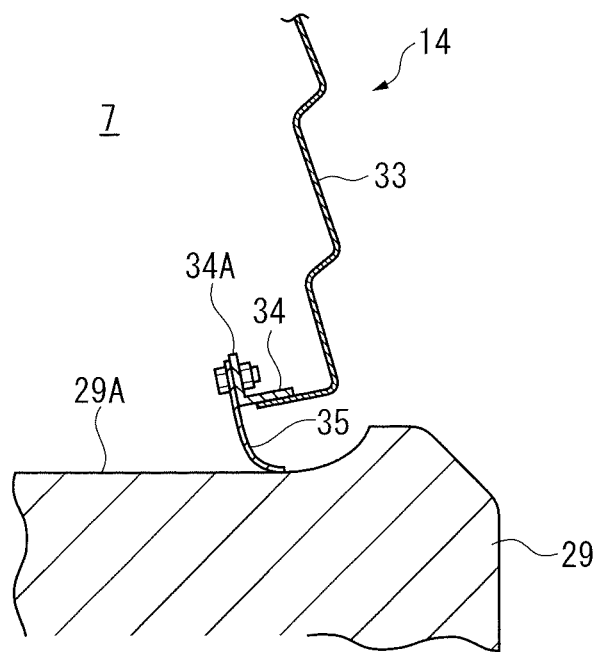
FIG. 6 is a vertical cross section of a fixed grill adjacent to the open/close grill, which is taken along arrows VI-VI in FIG. 2.

FIG. 6 shows a vertical cross section of the fixed grill 14.

The fixed grill 14 is also provided by a frame body formed by framing four components and fixing a sub ventilation portion 33 provided by a punching metal in the frame body. The ridge portions, valley portions, bending angle, bending radius and shape of the face section of the sub ventilation portion 33 of the fixed grill 14 are similar to those of the main ventilation portion 17. The sub ventilation portion 33 is also provided by press molding as in the main ventilation portion 17.

The frame member 34 defining a lower side of the fixed grill 14 has an L-shaped cross section and a rise piece 34A. A second cover 35 for closing a gap between the fixed grill 14 and the counterweight 29 is bolted to the rise piece 34A.

The second cover 35 is provided by a rectangular rubber sheet having a length substantially equal to that of the frame member 34 and is attached like a curtain to the frame member 34. Since the fixed grill 14 is not opened/closed unlike the open/close grill 13, even when the second cover 35 is provided by a curtain-like rubber sheet and a lower edge of the second cover 35 is in contact with the upper surface 29A of the counterweight 29, the lower edge is not rubbed against the upper surface 29A and is not likely to be worn away.

In this exemplary embodiment, external air is sucked from the rear side of the vehicle into the cooling chamber 7 through the ventilation portions 17 and 33 of the grills 12 and 14 in accordance with the rotation of the cooling fan 71. Accordingly, large-sized foreign substances are captured on the outer surface of the ventilation portions 17 and 33 of the grills 12 and 14. Since the adhesion of the foreign substances reduces the cooling efficiency, the cooling fan 71 is reversely rotated automatically or by an operator's operation on a selection switch. At this time, since the length H1 of the wavy shape of the ventilation portions 17 and 33 is larger than the length H2, the discharged foreign substances easily fall downward without being caught in the valley portions 26. Further, since the bending radius R2 of the wavy shape of the ventilation portions 17 and 33 is larger than the radius R1, the foreign substances are easily discharged without being accumulated in the valley portions 26. Further, since the bending angles θ1 and θ2 of the wavy shape of the ventilation portions 17 and 33 are obtuse, the foreign substances are easily discharged without being accumulated in the valley portions 26.

Figure 7:
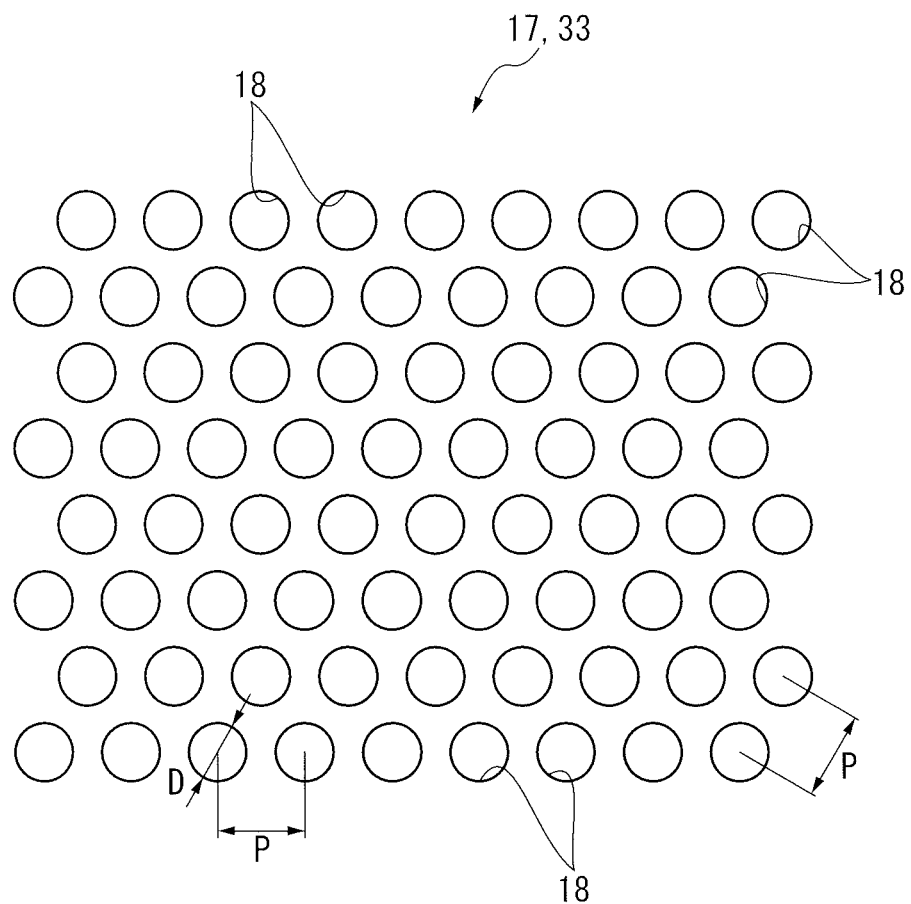
FIG. 7 is an enlarged view showing a primary part of the open/close grill and the fixed grill.
Figure 8:
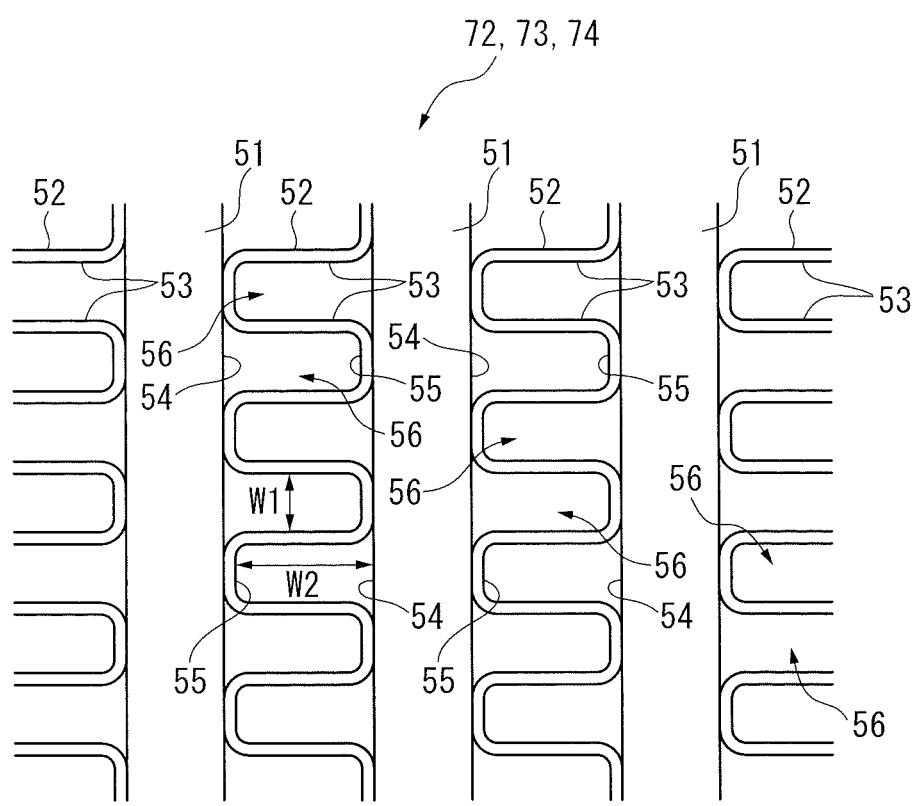
FIG. 8 is an enlarged view showing a primary part of a radiator of the wheel loader.

FIG. 7 is an enlarged view of a punching metal used for the ventilation portions 17 and 33 of the grills 13 and 14. FIG. 8 is an enlarged view of a core of the radiator 72, the aftercooler 73, the oil cooler 74 and the air-conditioner condenser.

In this exemplary embodiment, a diameter D of the large number of air intakes 18 formed in the punching metal is 3 mm. A pitch P between the air intakes 18 that are arranged in a zigzag manner is 4.5 mm. Though not illustrated, the thickness of the punching metal is 1.6 mm.

The core includes a plurality of tubes 51 through which fluid flows and rectangular wavy fins 52 disposed in apertures between the tubes 51 and rigidly attached to the tubes 51.

The fluid passing through the tubes 51 is cooling water of the engine 10 (for the radiator 72), intake air supplied to the engine 10 (for the aftercooler 73), hydraulic fluid for a hydraulic actuator (for the oil cooler 74) and coolant circulating between the air conditioner and the tubes (for the air-conditioner condenser).

The fins 52 are provided by applying wavy processing on a continuous thin plate with a wavy processing machine. Dimension W1 between opposed sides 53 of the wave portion of the fins 52 is 3 mm. Dimension W2 between a side 54 of the tube 51 facing the aperture and an opposed side 55 of the fin 52 opposed to the side 54 is sufficiently larger than W1.

In other words, according to this exemplary embodiment, the relationship between the diameter D of the air intakes 18 of the punching metal and the dimensions W1 and W2 of the core proves that the size of the opening of an inter-wave space 56 of the fin 52 is larger than the size of the opening of the air intakes 18. Thus, foreign substances such as dusts drawn in into the cooling chamber 7 through the air intakes 18 can directly pass through the inter-wave space 56 and are discharged through the exhaust outlets 6C and 6D (FIGS. 1 and 2) with further larger openings and the like, so that extremely little amount of dusts are clogged in the core or reside in the cooling chamber 7.

Further, since all of the cores of the plurality of cooling devices disposed in the cooling chamber 7 have the same fin pitch, foreign substances are kept from clogging only in a particular one of the cooling devices.

Further, the foreign substances adhered on the surface of the punching metal of the main ventilation portion 17 without passing through the air intakes 18 can be washed out by washing water of a predetermined pressure from a backside of the main ventilation portion 17. At this time, the washing water can be blown with a normal standing posture by opening the open/close grill 13 in the right and left directions. In other words, it is not necessary to blow the washing water with upward posture, so that the work can be facilitated.

It should be understood that the scope of the present invention is not limited to the above-described exemplary embodiment but includes modifications and improvements as long as the modifications and improvements are compatible with the invention.

In the above exemplary embodiment, the radiator 72, the aftercooler 73, the oil cooler 74 and the air conditioner condenser (not shown) are exemplified as the cooling device of the invention. However, it is not necessary in the invention to house all of the cooling devices in the cooling chamber but it is only required that at least one of the cooling devices is housed in the cooling chamber.

Further, a hybrid radiator may be used as the other cooling device. A hybrid work vehicle including a generator driven by an engine, an electric motor supplied with the power generated by the generator and various working equipment(s) driven by the electric motor includes an electric storage device such as a capacitor for accumulating the generated power. The hybrid radiator refers to a device for cooling the cooling water for the electric storage device and for a controller that controls discharge and charge of the power.

Though a draw-in mechanism in which the cooling air is drawn into the cooling chamber through the grill 12 is described in the exemplary embodiment, the invention is applicable to a discharge mechanism in which the cooling air is drawn in through an intake hole on the outer side of the cover and is discharged through a grill.

Though the air intakes 18 are circular in the exemplary embodiment, the air intakes 18 may have a polygonal shape such as quadrangular or hexagonal shape.

Though the fins 52 of the core of the cooling device have a rectangular wavy shape in the exemplary embodiment, the fins 52 may have sine-wave shape, triangular shape or the like.

In other words, the fins 52 may be provided in any shape as long as the size of the opening of the inter-wave space of the fin is not less than the size of the opening of the air intakes and the foreign substances drawn in through the air intakes can easily pass through the inter-wave space.

The invention claimed is:

1. A wheel loader comprising:
   a cooling chamber that houses a cooling fan and a cooling device; and
   a grill through which a cooling air flowing toward the cooling chamber flows,
   the grill comprising a frame provided by framing four side components comprising vertical frame members oriented generally along a vertical direction and horizontal frame members oriented generally along a horizontal direction, and a ventilation portion provided in the frame by a punching metal with a plurality of air intakes,
   the ventilation portion being a stepwise member having a vertically arranged plurality of steps, the plurality of steps including a plurality of face sections that are interposed by alternating ridge and valley portions, the ventilation portion having a three-dimensionally curved surface bulging toward an outside of the cooling chamber along both the vertical and horizontal directions,
   wherein each of a bending angle of the ridge portion and a bending angle of the valley portion is obtuse, and
   wherein each vertical length of a first of the plurality of face sections that are positioned immediately vertically below the valley portions is greater than each vertical length of a second of the plurality of face sections that are positioned immediately vertically above the valley portions.

2. The wheel loader according to claim 1, wherein a bending radius of the valley portion of the grill is larger than a bending radius of the ridge portion of the grill when the grill is seen from an outside.

3. The wheel loader according to claim 1, wherein the grill comprises an open/close grill member provided at a center of the grill, the open/close grill member being adapted to be opened and closed and a fixed grill member disposed on both right and left sides of the open/close grill member.

4. The wheel loader according to claim 3, wherein the open/close grill member is adapted to be opened toward a right side of the open/close grill member.

5. The wheel loader according to claim 3, wherein an upper side of the open/close grill member is positioned nearer to a front side of the wheel loader as compared to right, left, and lower sides of the open/close grill member.

6. The wheel loader according to claim 4, wherein an upper side of the open/close grill member is positioned nearer to a front side of the wheel loader as compared to right, left, and lower sides of the open/close grill member.

7. The wheel loader according to claim 1, wherein the cooling air flowing toward the cooling chamber flows through the grill before being introduced into the cooling chamber.

8. A wheel loader comprising:
a cooling chamber that houses a cooling fan and a cooling device; and
a grill through which a cooling air flowing toward the cooling chamber flows,
the grill comprising a ventilation portion including a punching metal with a plurality of air intakes, and means for framing the ventilation portion along generally a vertical direction and a horizontal direction,
the ventilation portion being a stepwise member having a vertically arranged plurality of steps, the plurality of steps including a plurality of face sections that are interposed by alternating ridge and valley portions, the ventilation portion having a three-dimensionally curved surface bulging toward an outside of the cooling chamber along both the vertical and horizontal directions,
wherein each of a bending angle of the ridge portion and a bending angle of the valley portion is obtuse, and
wherein each vertical length of a first of the plurality of face sections that are positioned immediately vertically below the valley portions is greater than each vertical length of a second of the plurality of face sections that are positioned immediately vertically above the valley portions.

9. The wheel loader according to claim 8, wherein a bending radius of the valley portion of the grill is larger than a bending radius of the ridge portion of the grill when the grill is seen from an outside.

10. The wheel loader according to claim 8, wherein the grill comprises an open/close grill member provided at a center of the grill, the open/close grill member being adapted to be opened and closed and a fixed grill member disposed on both right and left sides of the open/close grill member.

11. The wheel loader according to claim 10, wherein the open/close grill member is adapted to be opened toward a right side of the open/close grill member.

12. The wheel loader according to claim 10, wherein an upper side of the open/close grill member is positioned nearer to a front side of the wheel loader as compared to right, left, and lower sides of the open/close grill member.

13. The wheel loader according to claim 11, wherein an upper side of the open/close grill member is positioned nearer to a front side of the wheel loader as compared to right, left, and lower sides of the open/close grill member.

14. The wheel loader according to claim 8, wherein the cooling air flowing toward the cooling chamber flows through the grill before being introduced into the cooling chamber.

15. The wheel loader according to claim 3, further comprising:
a counterweight provided at a rear of the wheel loader and below the cooling chamber; and
a first cover provided to a lower one of the vertical frame members of the open/close grill member, the first cover having a downwardly rounded contact portion configured to be in contact with the counterweight with a predetermined contact area.

16. The wheel loader according to claim 15, further comprising:
a second cover provided to a frame member of the fixed grill member vertically facing the counterweight, the second cover being provided by a soft sheet in a shape of a curtain, a lower end of the second cover being in contact with an upper side of the counterweight.

17. The wheel loader according to claim 10, further comprising:
a counterweight provided at a rear of the wheel loader and below the cooling chamber; and
a first cover provided to a lower part of the means for framing of the open/close grill member, the first cover having a downwardly rounded contact portion configured to be in contact with the counterweight with a predetermined contact area.

18. The wheel loader according to claim 17, further comprising:
a second cover provided to a part of the fixed grill member vertically facing the counterweight, the second cover being provided by a soft sheet in a shape of a curtain, a lower end of the second cover being in contact with an upper side of the counterweight.

19. The wheel loader according to claim 1, wherein the first of the plurality of face sections are positioned proximately below corresponding valley portions, and the second of the plurality of face sections are positioned proximately above corresponding valley portions.

20. The wheel loader according to claim 8, wherein the first of the plurality of face sections are positioned proximately below corresponding valley portions, and the second of the plurality of face sections are positioned proximately above corresponding valley portions.

* * * * *